No. 806,962. PATENTED DEC. 12, 1905.
R. J. ELLIS.
RASP.
APPLICATION FILED APR. 7, 1905.
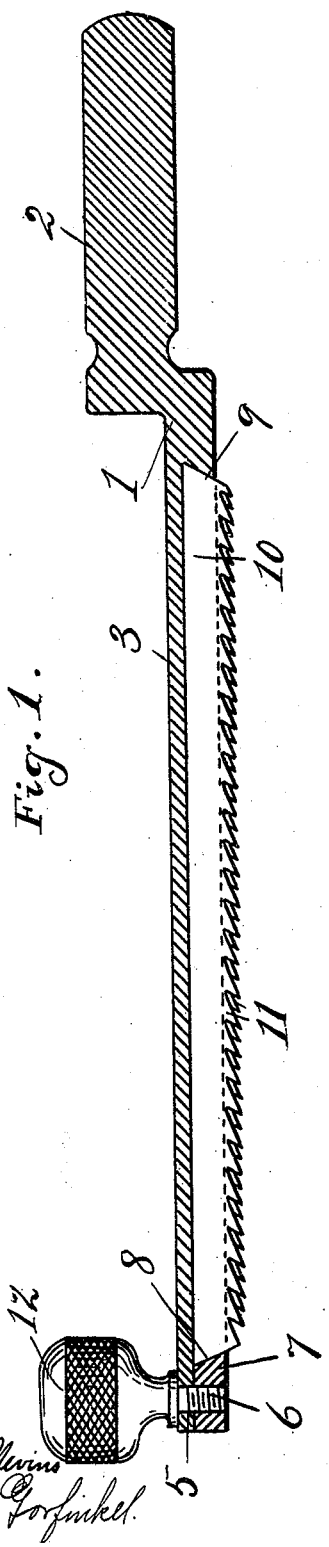
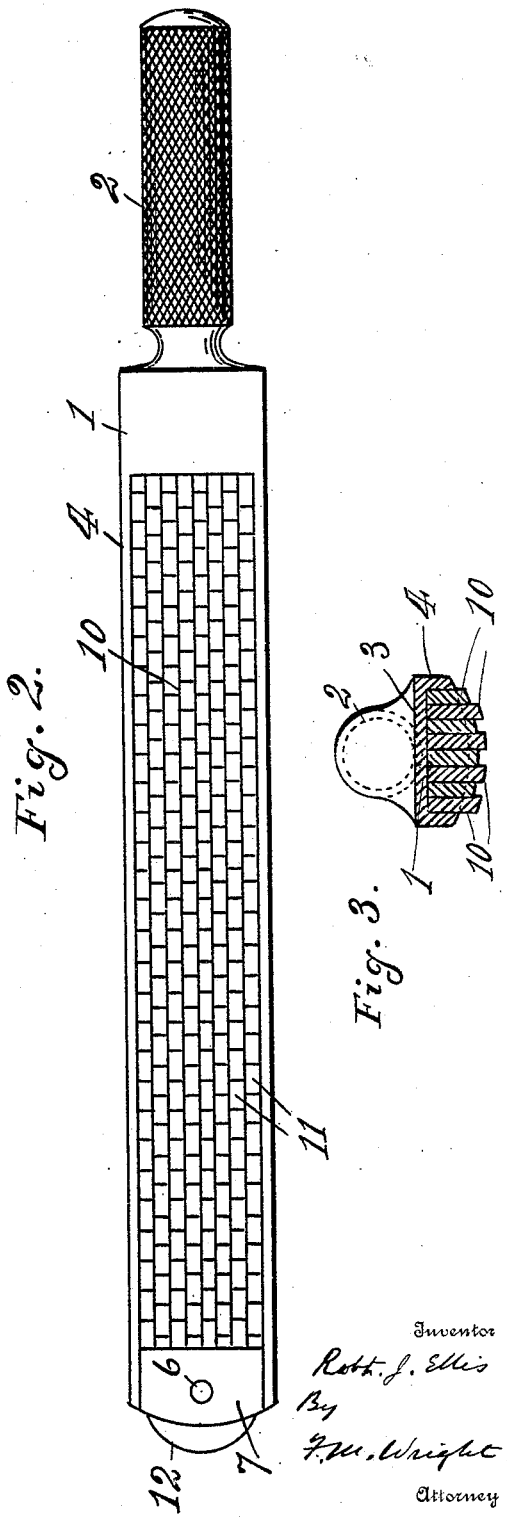
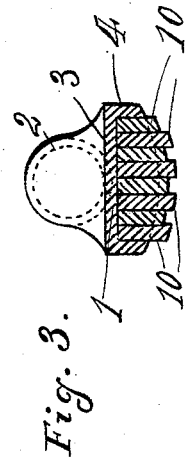

UNITED STATES PATENT OFFICE.

ROBERT J. ELLIS, OF SAN FRANCISCO, CALIFORNIA, ASSIGNOR OF ONE-HALF TO JOSEPH M. DIVEN, OF SAN FRANCISCO, CALIFORNIA.

RASP.

No. 806,962.      Specification of Letters Patent.      Patented Dec. 12, 1905.

Application filed April 7, 1905. Serial No. 254,320.

*To all whom it may concern:*

Be it known that I, ROBERT J. ELLIS, a citizen of the United States, residing at San Francisco, in the county of San Francisco and State of California, have invented certain new and useful Improvements in Rasps, of which the following is a specification.

This invention relates to improvements in rasps such as are used by carpenters for scraping rounded corners of wooden articles or by grooms in currying horses or for other purposes.

The object of the invention is to provide an article of this character which shall be convenient in use and in which the teeth of the rasp can be easily removed, sharpened, and replaced.

In the accompanying drawings, Figure 1 is a longitudinal section of the rasp. Fig. 2 is a bottom plan view thereof. Fig. 3 is a transverse section.

Referring to the drawings, 1 represents a holder having formed in one piece a rear handle 2, a back 3, and sides 4. The front end of the back is apertured, as shown at 5, to receive a clamping-screw 6, which after passing through said aperture is screwed into a clamping-plate 7, received between the sides of the holder. Said plate 7 is beveled or undercut on its inner side, as shown at 8, as is likewise the opposite end of the body of the holder, as shown at 9, to retain the rasp-blades 10, which blades are beveled at their ends, as shown. The blades are preferably arranged with the teeth 11 thereof alternating or breaking ranks, as shown in Fig. 2, so as to form a suitable rasping-surface. The clamping-screw 6 is formed with an enlarged head 12, which serves as a front handle convenient to be grasped by the operator. Upon unscrewing this clamping-screw the clamping-plate is released, so that the blades drop out and can then be easily sharpened and replaced.

I claim—

A rasp comprising a holder having a back and sides, toothed blades received in the cavity between said back and sides, a clamping-plate having an inner side engaging the ends of the blades to hold them in position, and a screw for holding said clamping-plate to the holder, said screw having an enlarged head to serve as a handle, substantially as described.

In witness whereof I have hereunto set my hand in the presence of two subscribing witnesses.

ROB. J. ELLIS.

Witnesses:
     FRANCIS M. WRIGHT,
     BESSIE GORFINKEL.